United States Patent [19]

Fritzler

[11] 4,113,367
[45] Sep. 12, 1978

[54] ROOF REFLECTIVE POLYGON SCANNING APPARATUS

[75] Inventor: Ulrich M. Fritzler, 65-15 Booth St., Rego Park, N.Y. 11374

[73] Assignee: Ulrich M. Fritzler, New York, N.Y.

[21] Appl. No.: 721,892

[22] Filed: Sep. 9, 1976

[51] Int. Cl.² ............................................. G03B 41/02
[52] U.S. Cl. .................................. 352/105; 352/106; 352/108; 352/111
[58] Field of Search ..................... 350/7; 352/105, 106, 352/107, 108, 110, 111

[56] References Cited

U.S. PATENT DOCUMENTS

| | | | |
|---|---|---|---|
| 1,154,835 | 9/1915 | Bauersfeld | 352/105 |
| 1,937,378 | 11/1933 | Alexanderson | 352/108 |
| 2,163,543 | 6/1939 | Clothier et al. | 352/108 |
| 2,666,357 | 1/1954 | Graham et al. | 352/108 |

FOREIGN PATENT DOCUMENTS 563,520  11/1931  Fed. Rep. of Germany ........... 352/105

Primary Examiner—Monroe H. Hayes
Attorney, Agent, or Firm—Harold L. Jackson; Stanley R. Jones; Joseph W. Price

[57] ABSTRACT

The present invention provides a multifaceted reflecting polygon scanner system that is suitable for incorporation into a projector, camera, or other optical scanning or image immobilizing apparatus. The rotating reflecting optical system of the present invention, is capable of being combined with a continuous film transport to produce an overlap frame dissolve of sequential frames for optical immobilization of a projected image. The present invention includes a primary roof reflecting polygon, a secondary reflecting polygon, and an image surface. By proper choice of the polygon parameters and their juxtaposition relative to the image surface, the present invention uniquely provides a significantly higher relative aperture with minimal kinetic aberrations such as dynamic keystone distortion and minimal static aberrations. In one embodiment, a pair of roof reflectors of a 60° and 90° included angle prevent the generation of ghost images while providing an aberration free image with an isotransport film motion. When incorporated into a projection system, a projection lens having low geometric distortion and a long back focal length can be utilized with the optical scanning system. The exact form of the projection lens would depend upon the particular adaptation of the reflecting polygon scanning system.

31 Claims, 5 Drawing Figures

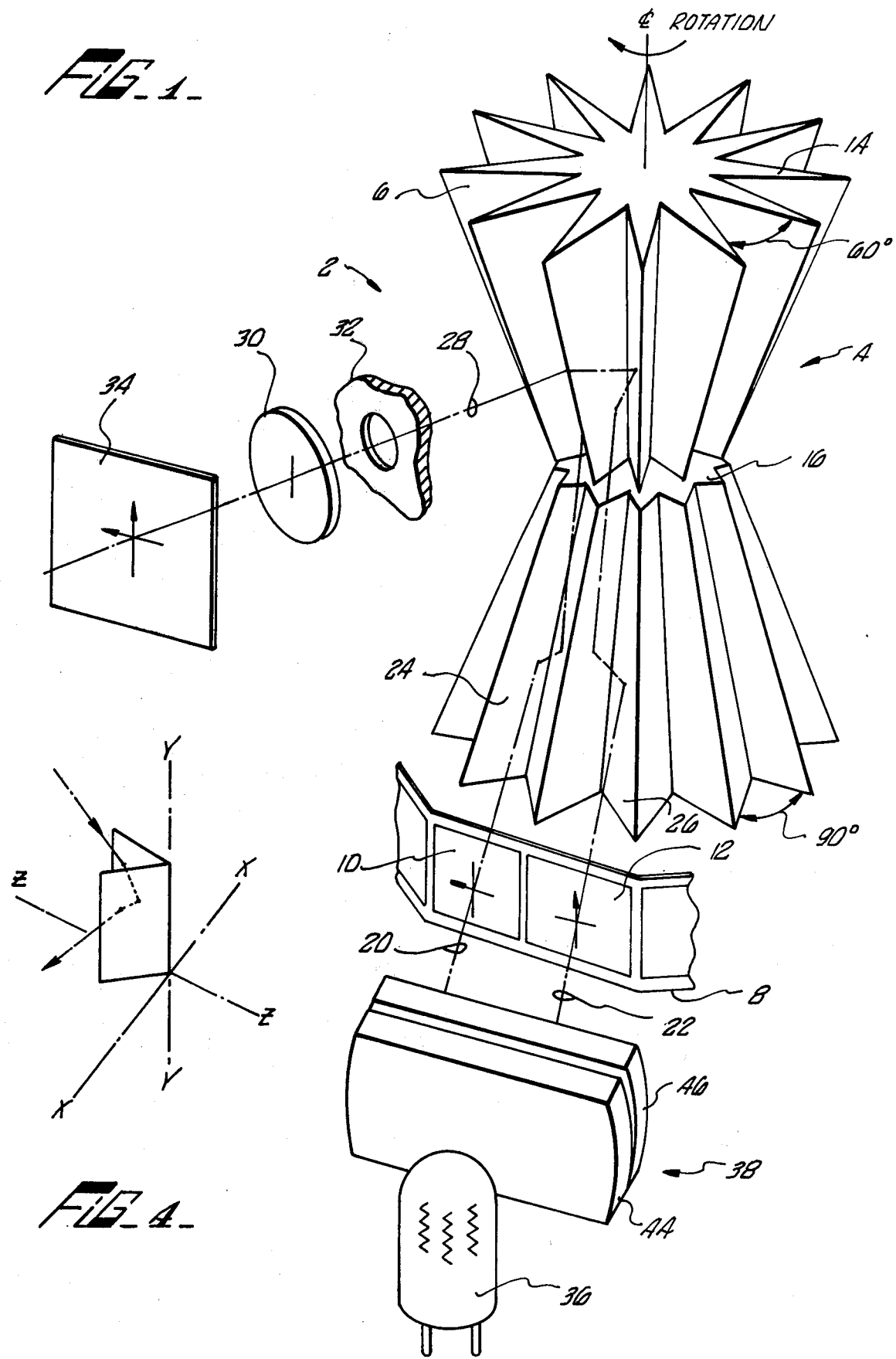

ROOF REFLECTIVE POLYGON SCANNING APPARATUS

BACKGROUND OF THE INVENTION

1. Field of the Invention

The present invention relates to an optical apparatus for projecting stationary images onto or from a relatively moving object such as a continuously moving film strip and more particularly to a multifacet reflecting roof polygon scanning system suitable for incorporation into projectors, cameras and optical scanning equipment to optically immobilize a moving image with relatively minimal distortion.

2. Description of the Prior Art

While the present invention is directed to a modular optical apparatus that can be incorporated as an essential component in a number of optical devices, reference will only be made herein to the field of motion pictures.

The conventional projection of motion pictures has required an intermittent-motion film transport mechanism. The conventional projector has traditionally produced objectionable noise, film wear, frame and screen registration errors and frame rate limitations. The noise that is typically created by the intermittent-motion projection system, has required a projection booth in a commercial environment. The required intermittent movement not only damages the perforations in the film but the continuous starting and stopping and flicker effects cause severe speed limitations. Frequently, the projected images appear to bounce due to vertical instability and flicker is still present in conventional equipment. Additionally, the intermittent-motion creates interfacing problems between the correlations of the sound and visual characteristics of the motion picture.

In one conventional projector, a three bladed shutter, wherein each blade has a 55° sweep, will block a total of 165° of a total of 360° of illumination. In effect, this means that 46% of the time the screen is blackened due to the light loss related to the shutter affect. This reduces the apparent image illuminance correspondingly by 46%. In addition, the complicated structure of the intermittent-motion transport requires a complex interfacing of the film into the projector.

A conventional projector when utilized in a video converter application requires a compensator to immobilize the film frame on the screen for solving the synchronization problem associated with the normal projection rate of 24 frames per second of a motion picture film interfaced with the 30 fields per second scanning of the typical video system.

Various forms of optical compensating devices, have been suggested over the last 60 years. Optical compensators or image immobilizers have classically fallen under three separate categories; rotating and/or oscillating mirror devices, rotating lens devices and rotating polygon prism devices. The German built Mechau projector of U.S. Pat. No. 1,401,346 is a classical example of a mirror type of optical compensator. The Mechau projector was built in the 1920's and was apparently the first technically successful continuous projector.

The Alexanderson U.S. Pat. No. 1,937,378 and the Ripley et al U.S. Pat. No. 1,091,864 disclose relatively simple polygon reflecting projectors.

The Bauersfeld U.S. Pat. No. 1,154,835 discloses a reflector drum which has a reflector comprising three planar reflectors having perpendicular reflecting surfaces which are respectively lying along a Cartesian coordinate with a film window limiting the illumination of the film frame.

The Campbell U.S. Pat. No. 3,583,798 discloses a high speed camera incorporating an optical compensator comprising a centrally fixed mirror for directing a light ray outward to a reflective rhombic configuration.

The Miller U.S. Pat. No. 1,530,903, Barr U.S. Pat. No. 663,153 and U.S. Pat. No. 1,156,596 are cited of general interest.

The Thun German Pat. Nos. 547,240 and 563,520 are directed to a lenticular lens systems for high speed photography.

Rotating lens devices have been less successful than the mirror devices or other methods due to the aberration problems and the cost requirement for precision lenses.

Examples of the rotating prism optical compensators can be found in the Leventhal U.S. Pat. Nos. 2,085,594; 2,417,002 and Re22,960. The Tuttle U.S. Pat. No. 2,070,033, Eisler U.S. Pat. No. 2,262,136 and Husted U.S. Pat. No. 3,539,251 are other examples of prism optical compensators.

Optical immobilization can be described as a displacement of a light beam through the optical system in such a manner that the portion of the beam coming from the subject, in the case of a camera taking a picture, or the portion of a beam extending from the projector to the screen, in the case of a motion picture projection, is held rigidly stationary, centered at the optical axis of exposure or projection respectively, while the portion of the beam which is immediately adjacent the intersecting film, is optically displaced so as to move in synchronism with the movement of the film.

The use of a rotating solid polygonal prism can produce a refraction of a light beam as it enters the prism and again as it leaves the prism to offset or displace a section of the beam within the apparatus, while maintaining the displaced section parallel to the stationary portion of the beam. The displaced section of the light beam directly intersects the film with the displacement being of a progressive or frame lap dissolve nature such that the displacement portion of the beam continually moves in exact synchronism with the moving film.

A solid polygon having an appropriate refractive index can provide frame lap dissolve. The refractive index would have to be in the order of 2.0 and the corresponding aberration control would demand a minimum of 26 facets which implies a maximum relative aperture of approximately f/7. In realizable solid polygon systems a refractive index of approximately 2.0 cannot be achieved and each successive projected frame replaces its predecessor frame in a top to bottom "wiping" motion with an inherent flicker that requires a corrective shutter between the frames.

An optical compensator that was developed for the Philco Research Division for use as a motion picture film scanner for television transmission in the early 1950's recognized some of the problems of a solid polygon. The Kudar U.S. Pat. Nos. 2,972,280 and 2,860,542 described this work. Basically, the Kudar patents disclose a hollow polygon device which utilized a set of prisms located within a cylindrical cavity of the polygon to deviate the light beam sufficiently to permit a lap dissolved framing which was flicker free, required no shutter, achieved a moderate relative aperture, for a 24 facet system, while at the same time provided moderate control of optical aberrations and film shrinkage compensation. The Kudar devices as described in the patents were developed upon the theory that the parallelism of the stationary and displaced portions of the projected beam required, the beam to be refracted to the same extent upon entering and leaving the polygon prism. Some of the disadvantages of the Kudar system include a limitation of the relative aperture of the optical system, the requirement of expensive materials for the prisms, the existence of field curvature aberrations and other refractive optical aberrations which are particularly destructive in a projection system. The Kudar device however has been utilized as a color television film scanner as described in the paper, "New 35 mm Television Film Scanner" Journal of SMPTE, Vol. 62, January 1954, Page 45.

The Kirkham U.S. Pat. No. 2,817,995 suggests a modification of a hollow polygonal prism concept by the provision of a rotatable compensating core to permit adjustment for the film shrinkage.

The Korb U.S. Pat. No. 2,515,453 is cited of general interest to disclose a single pass prism optical compensator.

Some devices of the prior art are capable of providing flicker-free lap dissolve framing, no shuttering and film shrinkage adjustment. For example the Kudar device taught the extension of the optical path through the compensator and the compensation of film shrinkage by the various mounting of movable prisms within the hollow polygon. The result was accomplished with relatively expensive components and provided a limited relative aperture while introducing kinetic refractive aberrations.

Problems such as dynamic keystoning and ghost images still exist when applying prior art polygon reflective scanners to motion picture projectors and cameras. There is still a need to eliminate aberration problems while providing a maximum relative aperture to maximize the light efficiency of the system.

SUMMARY OF THE INVENTION

The present invention provides a modular optical compensator apparatus for the reflective modification along an optical axis of a transmitted beam of energy, such as light, to provide an image immobilization at an image surface. The modular optical compensator can be utilized as an integral element of a number of optical devices wherein the portion of a beam of energy coming from the subject, for example, in the case of a camera taking a picture, or the portion of the beam extending from the projector to the screen in the case of motion picture projection, is held rigidly stationary, centered at the optical axis of exposure or projection respectively, or the portion of the beam which is immediately adjacent the intersecting film, is optically displaced so as to move in synchronism with the movement of the film. This is accomplished while providing maximum light efficiency and a minimum of distortion and aberration problems including the removal of dynamic keystoning and projected ghost images.

Basically, a pair of polygon members having a plurality of complementary planar reflective surfaces are positioned at a 90° angle and are conjointly rotated. At least one polygon member has a roof mirror geometry and preferably both polygons include roof mirrors. An image surface, such as a film, is located adjacent the outer periphery of one polygon member. Means are provided for rotating the image surface and reflecting polygon members about the common axis of rotation whereby a beam of energy can scan an image surface and be reflected between reflective surfaces on each polygon member. Specific geometric relationships are required wherein $d_1$ is the distance along the optical axis between a reflective surface or the intersection line of a roof mirror on one polygon member and the intersection line of the roof mirrors on the other polygon member, $d_2$ is the radial distance from the common axis of rotation to a plane containing the reflective beam of energy between the two polygon members and $d_3$ is the radial distance of the common axis of rotation to the image surface. The respective distances being related in the following manner;

$$d_3 = 2d_2 - d_1 \qquad (1)$$

For a given number of roof mirror pairs or facets, the particular optical compensator apparatus can be scaled in direct proportion to the film format height. If a projection lens is utilized with the optical compensator apparatus its back focal length will be coincident with the common axis of rotation. The distance along the optical axis between the reflective surfaces or roof mirror pairs can be varied to compensate for any shrinkage or expansion of a film.

In one embodiment of the present invention, it has been discovered that the use of a 60° roof angle between two mirrors of a four mirror system has the unique property that, properly positioned, a ray incident from any direction other than an XZ plane will make three reflections and exit from the roof mirrors with exactly the same direction that the ray would have if it were reflected once from a single flat mirror positioned along the intersection of the roof mirrors and in a plane perpendicular to the axis of the ray. The advantage of this feature is to permit the replacement of a single flat mirror facet with 60° roof angle mirrors that significantly remove secondary or ghost images in the optical system that can occur with a flat mirror facet.

Finally, the use of a 90° roof angle mirror facet adjacent the image plane coupled with the simultaneous constant illumination of two full film frames permits a practical image immobilization with the removal of dynamic keystoning.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective schematic, not drawn to scale, of the components of the present invention for the purpose of showing a pair of reflecting polygon members rotated to a position to provide equal illumination of two frames of a film;

FIG. 4 is a schematic of a 60° roof mirror segment, and

FIG. 5 is a cross-sectional view of an optical compensator apparatus utilized as a motion picture projector.

BRIEF DESCRIPTION OF THE PREFERRED EMBODIMENT

Figure 3:
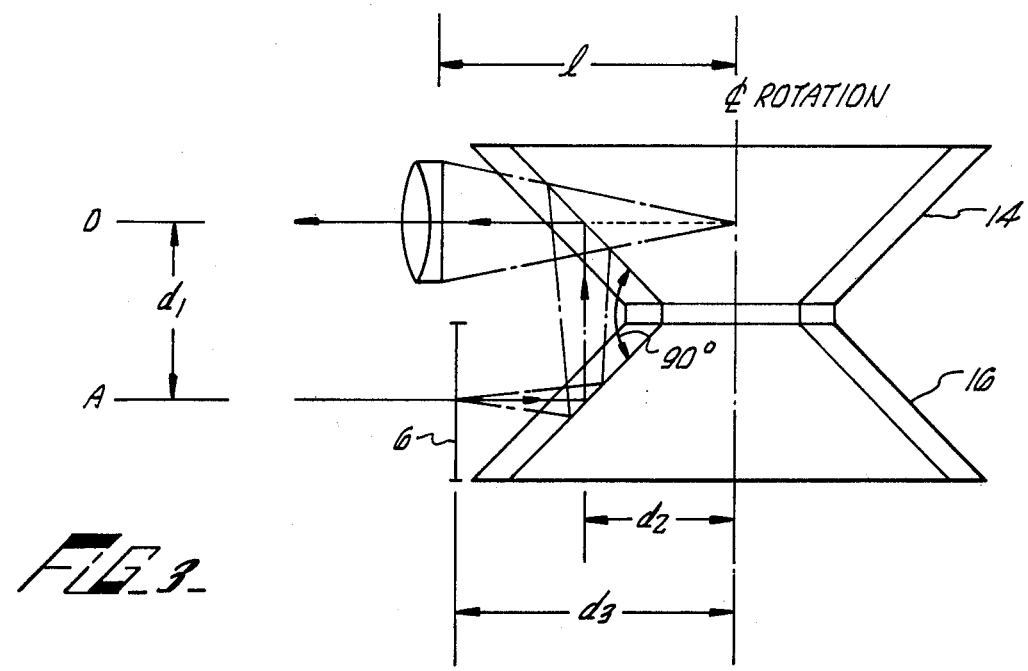
FIG. 3 is a cross-sectional schematic view setting forth the geometric relationships of the optical compensator of the present invention.

The following description is provided to enable any person skilled in the optical art to make and use the invention and sets forth the best modes contemplated by the inventor of carrying out his invention. Various modifications however, will remain readily apparent to those skilled in the art since the generic principles of the present invention have been defined herein specifically to provide a modular optical device that can be manufactured in a relatively economical manner.

Referring to FIG. 1 the present invention relates to a modular optical device capable of performing a basic image transmitting operation that may be incorporated into a large number of optical systems such as a projector, camera, movie editing table, dual slide projector, tele-cine converters, and optical scanning or image immobilizing equipment. Likewise, the present invention can be utilized across a spectrum of energy transmission and is not limited specifically to the visual spectrum of 400 nanometers to 700 nanometers.

Frequently, the term optical compensator or optical immobilization has been utilized to describe the desired function of the present invention. In this regard, reference is made to the Kudar U.S. Pat. Nos. 2,972,280 and 2,860,542 which are incorporated herein by reference simply to supplement the disclosure with respect to terminology and the basic theory relating to optical immobilization.

The rotating reflecting polygon scanner mechanism of the present invention in a projector system causes the frames of a moving film to appear to be projected without motion and successive film frames are coincidentally projected in a lap-dissolved framing process which ensures perfect registration from frame to frame. In this regard, it should be realized that the present invention is equally adaptable for use as a camera, as is commonly known to an optical designer.

Referring briefly to FIG. 1, the present invention is shown incorporated into a cine film projector 2 and utilizes a continuous motion, noiseless film transport (to be described hereinafter) in association with the rotating polygon scanner mechanism 4 which is mechanically incorporated into the film transport so that no mechanical back lash or misregistration can exist. The schematic view presented in FIG. 1, is simply for purposes of illustration and is not drawn to scale. In this regard, the individual facets of the polygon scanner 4 have been exaggerated and only a limited number are shown as compared to an actual reflecting facet projector which will be subsequently described.

The image surface or film, being scanned, is located at the periphery of one edge of the polygon scanner 4. In FIG. 1, a flat image surface is disclosed as a film strip 8 having a plurality of individual frames 10, 12, etc. The use of a flat image surface is possible due to the optical axis translational characteristics of the lower polygon member.

The polygon scanner 4 includes an upper or first reflecting polygon member 14 and a lower or second polygon reflecting member 16. Advantageously, each of the polygon reflecting members can be injection molded from plastic to either receive the individual reflecting segments 6 or to provide directly surfaces that can be coated with a reflecting material. The segments 6 are preferably front surface roof reflectors. The first polygon reflecting member 14 and the second polygon reflecting member 16 are appropriately fastened together to align the respective reflecting segments 6 on each member and for movement conjointly. The second polygon reflecting member 16 can be provided with appropriate sprockets designed to intermesh with perforations in the film strip 8. As can be readily realized, the firm transport system can be utilized to drive the film strip 8 which in turn can drive the polygon scanner 4. Conversely, the polygon scanner 4 can be utilized to drive the film strip 8. The use of additional guide rollers, reels and audio equipment are obvious expedients known to those skilled in the art and accordingly are not disclosed nor necessary for an understanding of the present invention.

In FIG. 1, the position of the film strip 8 and the polygon reflective segments 6 of the first polygon reflecting member 14 and a second polygon reflecting member 16 are disclosed with the polygon scanner 4 at a midrotation point between the two adjacent reflective segments so that the center of two adjacent film frames 10 and 12 are equally illuminated and are being precisely superimposed upon each other as they leave the reflecting polygon scanning system.

An extended source of light 36 is utilized in combination with a condensor lens assembly 38 to ensure a full illumination of two sequential frames 10 and 12.

As can be seen from FIG. 1, a light ray 20 is traced through the centric of film frame 10 and is subsequently reflected upward from the roof mirror pair 24 on the lower or second polygon reflecting member 16. A light ray 22 passes through the centric of film frame 12 and is reflected upward from the roof mirror pair 26 on the second polygon reflecting members 16 due to the geometrical dimensions to be described subsequently and the aligned relationship of the first and second polygon reflecting members 14 and 16. Both light rays 20 and 22 are combined as they are reflected off of the first polygon reflecting member 14 to form a composite light ray 28 extending from the surface of the upper polygon reflecting member 14. A projection lens 30 and aperture stop 32 can be inserted along the axis of the light ray 28 to project an image of an appropriate screen 34.

As will be disclosed subsequently in reference to FIG. 5, the first polygon reflecting member 14 and the second polygon reflecting member 16 are mechanically interlocked and the intersection plane of the roof mirror pairs of the first polygon reflecting member 14 form an angle of 90° with their respective aligned intersection plane of the roof mirror pairs of the lower or second polygon reflecting member 16. The first and second polygon reflecting members 14 and 16, and the film strip 8 rotate as a single integral unit about a common center or rotational line.

When the modular polygon scanner 4 of the present invention is incorporated into a projector 2, the optical axis of the projection lens 30 must always pass through one specific point of the projection screen 34. Projecting this optical axis through the aperture stop 32 onto the first polygon reflecting member 14 when the polygon reflecting member 14 is rotated to exactly midrotation point between adjacent roof mirror pairs causes the optical axis to be split into two components coincident with the light rays 20 and 22. Thus, the optical axis at this position is bifurcated and can be traced downward from the first polygon reflecting member and then radially outward from the respective mirror pairs 24 and 26. These light rays pass precisely through the centric of frames 10 and 12 of film strip 8. Thus, the optical axis of the system experiences a partial angular deviation by the first polygon reflecting member 14 and a further partial angular deviation of the axis by the mirror pairs 24 and 26 respectively. The precise interception of light ray 20 with the centric of frame 10 concurrent with the precise interception of light ray 22 with the centric of frame 12 will only occur for one specific and unique set of physical dimensions. This unique set of dimensions will provide precise overlap registration of two sequential frames when the polygon reflecting members 14 and 16 have rotated to the midrotation position shown in FIG. 1. Some minor non-linearity exists in the form of small registration errors. This nonlinearity, however, can be minimized within the image tolerances of a conventional projection system by using a large number of mirror pairs on the respective first and second polygon reflecting members 14 and 16. Thus, the number of mirror pairs that are utilized is partially dictated by the accuracy of the intended application of the modular polygon scanner 4 of the present invention.

The use of a 60° roof angle between the two mirrors of the upper polygon member provides a unique property to this embodiment of the present invention. This property can be appreciated by reference to FIG. 4. A light ray incident from any direction other than an XZ plane will make three reflections and exit from the roof mirrors with exactly the same direction that the incident ray would have if it were reflected once from a single flat mirror positioned along the intersection of the roof mirrors and in a plane perpendicular to the axis of the ray. Initially, it would appear that this aspect of the invention simply complicates the construction because a single flat facet would provide the same ray deviation. However, an unexpected advantage is realized since secondary images or ghost images are prevented by the 60° roof geometry. Thus, incident light striking the adjacent roof mirror pairs on the lower polygon are not transmitted by the upper polygon. Not only will the same angular orientation of an incident ray on the flat mirror be maintained but also the "hand" of the image will be maintained.

The condensor lens assembly 38 mentioned above is disclosed as a compound lens having a first positive biconvex lens 44 and a second positive biconvex lens 46. These lenses are located in close proximity to the surface of the film strip 8 and are designed to form an image of source 10. The condensor lens assembly 38 is specifically designed to cover the two adjacent frame areas of frame 10 and 12 fully. As a result of these design features, the full projected image area can be uniformly illuminated with the maximum possible luminous energy and the image illuminance is constant and maximum for all rotation angles of the polygon scanner 4.

Figure 2:
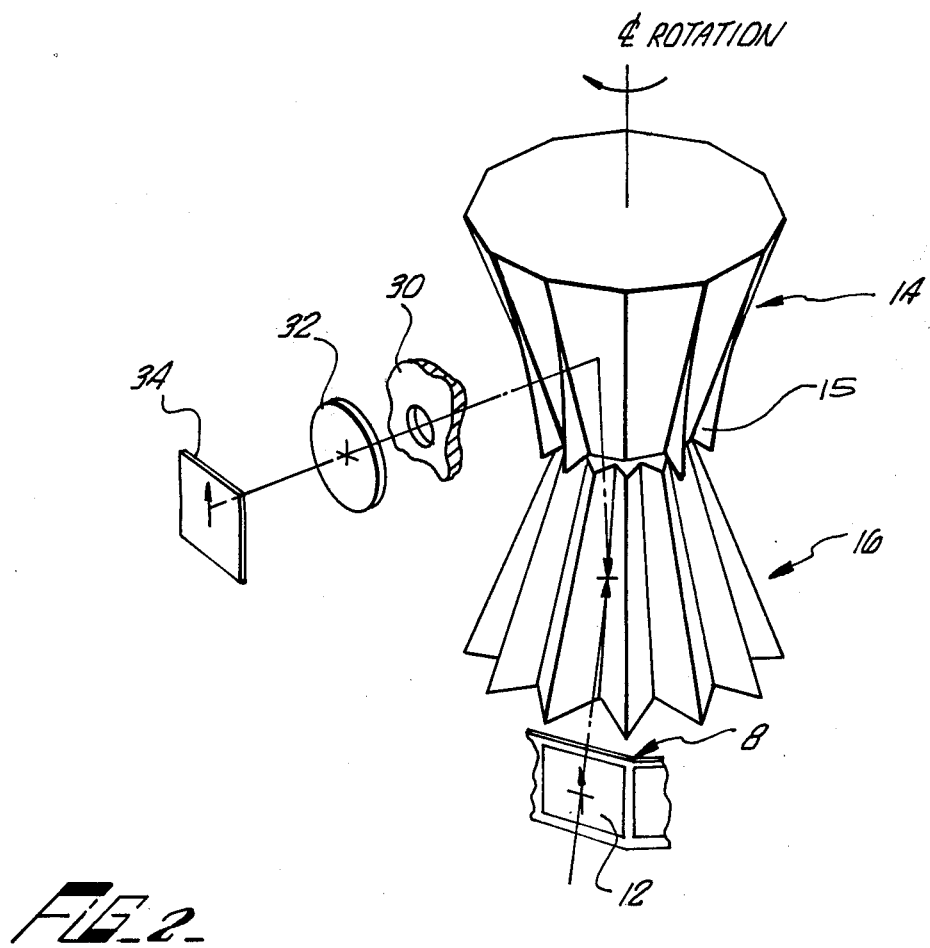
FIG. 2 is a perspective schematic, not drawn to scale, of a second embodiment of the invention, showing the relative positions of the polygon members to illuminate only one frame.
Figure 6:
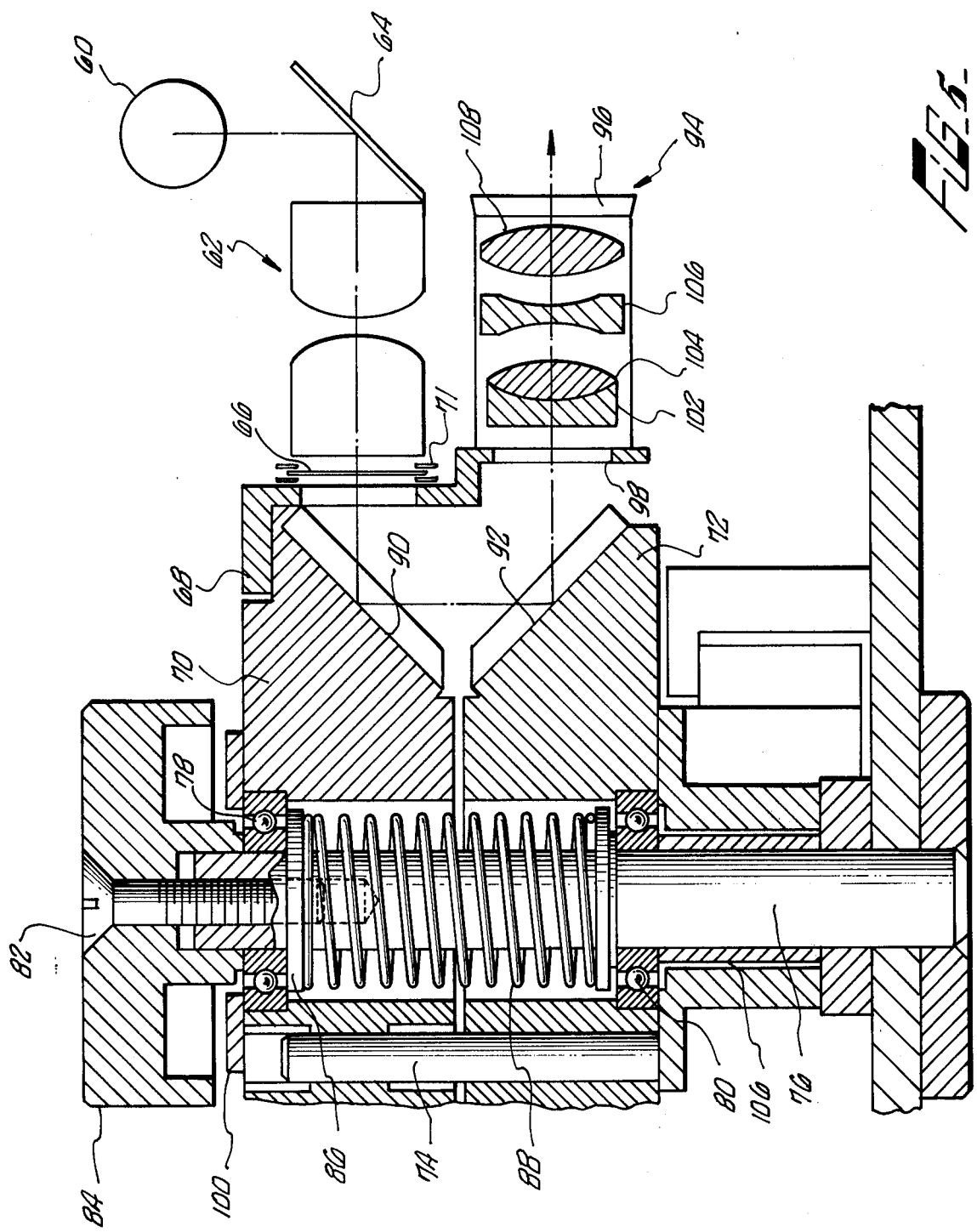

Referring specifically to the ray trace of FIG. 2, an alternative embodiment of the present invention is shown with the optical axis of the polygon scanner 4 is shown as drawn from the center of flat reflective facet 42 and roof mirror pairs 26 through the centric of frame 12 on the film strip 8 as a result of the rotation of the polygon scanner 4. In this position, frame 12 is receiving 100% of the light. Thus, the ray 22 along the optical axis is traversing a single frame that is projected by the full projection lens aperture and its adjacent frames contribute no light to the projected image. In FIG. 1, frame 10 and 12 contributed equally to the projected image in a lap dissolve frame sequence. A subsequent rotation of the polygon scanner 4 will again provide two adjacent frames projected with equal intensity as the polygon scanner 4 has rotated through half of one frame length. The effective relative aperture of the scanner 4 will be F/3.5 or better and since the system is shutterless and utilizes the maximum light it will be equivalent to a conventional three bladed projector of F/1.9 with even better frame to frame registration. Baffles 15 can be positioned between adjacent facets on each polygon member 14 and 16. For ease of illustration baffles 15 are disclosed only on the upper polygon member 14 in FIG. 2.

The illuminance of any one frame as a function of time can be controlled by the shape of the projection lens aperture 32. This control can be obtained generally at the expense of slightly reducing the aperture area and therefore the maximum illuminance level.

In special applications, various aperture geometries could be utilized to create a desired effect, such as a narrow slit aperture to produce the flicker of intermittent-motion projection systems at low framing rates and a long dwell-time on each frame. Since a slit aperture provides a minimum time overlap between adjacent frames, but has the poorest relative aperture and light collection efficiency, a condensor system which can use the polygon scanner 4 to counter the movement of the lamp filament image and maintain a fixed slit aperture function at the projection lens, has merit for long dwell-time framing applications.

With reference to FIG. 3, the specific and unique set of dimensions of the present invention are disclosed. A cross-sectional view of the first and second polygon reflecting members 14 and 16 are shown with a common axis of rotation. The film strip 6 is schematically shown with the optical axis extending through the centric of a frame. The optical axis can be traced from the second polygon reflecting member 16 upward and parallel to the first polygon reflecting member 14. The optical axis then extends radially outward through the aperture stop 32 and the projection lens 30. The distance, $d_1$, is the distance between the radially inwardly extending light trace from the centric of the frame and the radially outwardly extending optical axis of the projection of the image, in other words, $d_1$, is the distance between either a reflecting facet or roof mirror intersection on the first polygon and a roof mirror intersection of the second polygon reflecting member along the optical axis; $d_2$ is the distance from a common axis of rotation to the optical axis between the first and second polygon reflecting members 14 and 16, $d_2$ can also be described as the distance from the axis of rotation to a plane containing the reflected transmission energy beam along the optical axis between the two polygon members; $d_3$ is the distance from the common axis of rotation to the film strip 6 or an object being scanned. The specific and unique set of dimensions shown in FIG. 3 can be derived by a matrix transformation method. For a 26 pair of roof mirror polygon scanner and a 35 mm film format with the dimensions being derived as follows: $d_1 = 1.500$, $d_2 = 2.298$ and $d_3 = 3.095$ inches. The relationships between these distances can be expressed as follows:

$$d_3 = 2d_2 - d_1$$

the dimension between adjacent frames changes slightly with the shrinkage or expansion of the film strip 8. The change in film dimension however can be compensated by adjustment of $d_1$. The specific dimensions given above were derived for a 35 millimeter cine format with 0.748 inches frame separation and a 26 facet scanner geometry. All other formats and facet geometries are equivalent in concept to this specific case of the preferred embodiment and can be easily derived by an optical designer from the present disclosure.

To accommodate variations in the frame to frame separation which frequently occurs with shrinkage or expansion of the film, an adjustment of the $d_1$ dimension is achieved by the novel projector embodiment disclosed in FIG. 5.

FIG. 5 is a partial cross-sectional view of the polygon scanner 4 being utilized as a projector. A light source 60 is offset from the axis of a condensor lens assembly 62 and a fixed cold reflector 64 directs visual light rays from the light source 60 through the condensor lens assembly while passing infrared wavelengths. A film strip 66 is mounted on a film sprocket 68 having a circular periphery concentric with that of the first polygon reflecting member 70. Idler rollers 71 provide a flat image surface for at least two frame widths offset from the circular periphery. A second polygon reflecting member 72 is aligned to mechanically interconnect the first polygon reflecting member 70 by a dowel pin or pins 74. A pair of reflecting facets, one on each reflecting member, are accordingly relatively fixed and rotated with a respective frame on the film strip 66 as it passes through the light source rays. A common support shaft 76 can be mounted to an appropriate base or housing. Bearing 78 and 80 permit a relative rotational movement of both polygon reflecting members about the common support shaft 76. Bearing 78 is mounted relatively fixed to reflecting member 70 by a bearing retainer 100. Bearing 78 can slide relative to the support shaft 76. A screw 82 journalled within support draft 76 mounts an adjustment knob 84 which bears against the inner race of the upper bearing 78, which in turn bears against a spring retainer 86. A compression spring 88 biases the first and second polygon reflecting members 70 and 72 away from each other along the axis of the support shaft 76. Annular spacer 116 supports the inner race of bearing 80.

Reflecting mirrors 90 and 92 are mounted respectively on the first and second polygon reflecting members 70 and 72 to form an angle of 90° between their reflecting surfaces. A projection lens 94 having a long back focal length 1, or focal surface coincident with the axis of rotation or the center line of support shaft 76 is utilized. A pair of external baffles 96 and an aperture stop 98 are mounted on either side of the projection lens 94. While the specific projectin lens design will depend on the particular application of the scanner, FIG. 5 discloses, from image to projection side, a doublet formed of a negative biconcave lens 102 and positive biconvex lens 104; a negative biconcave lens 106 and a positive biconvex lens 108.

Appropriate gearing or power transmission (not shown) can be connected to the supporting frame of the first and second reflecting members 70 and 72 for driving both the reflecting members and also the film strip 66 through the film sprocket 68 in a known manner.

Since the frame to frame separation on the film strip 66 can vary due to shrinkage or expansion, the relative distance between the film facets are appropriately adjusted to maintain a composite registration of the frames by adjustment of the knob 84. The knob 84 is appropriately threaded on the support shaft 76 and can either compress or release the tension on the spring 88 by the movement of the upper polygon reflecting member 70.

It should be noted that the present invention is readily adapted to a wide variety of use. For example, it is possible to project three dimensional photography by the use of polarized window segments of alternatively left oblique and right oblique orientation. These windows (not shown) could be placed in close proximity to the frame plane on the lower reflecting polygon member 72.

Other system configurations could also use the modular polygon scanner 4 of the present invention such as dual slide projectors wherein two slides or film strips can replace the two adjacent frames of the above described film strip 8. Tele-cine converters could also incorporate the present invention wherein the projection screen would be replaced by a vidicon or equivalent optical transducer. Cameras obviously could also utilize the present invention with reversal of the direction of light, that is, the screen would be replaced by objects to be photographed and the film would be appropriately exposed for subsequent development. The scanner 4 of the present invention does not introduce any optical aberrations as compared to other polygon scanning systems that have severe aberration problems.

The specified and unique set of dimensions disclosed in FIG. 3 can be further complemented by three conditions for any chosen format and facet number configuration that will provide image immobilization. These conditions are that the back focal length, $l$, or focal surface of the projection lens must be coincident with the concentric center line or axis of rotation; the three dimensions, $d_1$, $d_2$ and $d_3$, must also satisfy the relation $d_3 = 2d_2 - d_1$ and for a chosen number of facets, the system scales in direct proportion to the format height. The image illuminance is constant and maximum for all rotation angles of the polygon scanner 4.

In addition, the polygon scanner could alternatively be supplemented with relatively movable optical wedges in the optical axis dimension $d_1$ to permit a shorter focal length scanner system.

The equation (1) $d_3 = 2d_2 - d_1$, sets forth the relationship of the components of the present invention in vacuum or air. This equation could be varied to take into account optical transmission in mediums other than air such as a refracting roof prism.

$N_1$ is the index of refraction for air or the ambient environment while $N_2$ is the index of refraction for a roof prism, e.g., glass or plastic. $d_1$ is the distance along the optical axis between the reflective edge surfaces of the prisms along the optical axis; $d_2$ is the distance from the common axis of rotation to a plane containing the optical axis between the reflective surfaces; $d_3$ is the distance from the common axis of rotation to the medium; $d_4$ is the distance along the optical axis from the rear edge of the roof prism to a plane containing the optical axis between the reflective surfaces and $d_5$ is the distance along the optical axis to the object or image surface from the rear edge of the prism. The resulting optical system can be defined as follows:

$$d_2 = \frac{d_5}{N_1} + \frac{(d_4 + d_1)}{N_2} \quad (2)$$

By equating $N_1$ and $N_2$ to 1, e.g., for an equivalent optical path, equation (2) becomes equation (1). Accordingly, from the teachings of the present invention any artisan skilled in the optical arts could provide a simple modification while still maintaining component positioning of a modular scanner within the air equivalent optical path of the present invention. In this regard, by finding the air equivalent optical path of any modification using two or more transmitting mediums of varying indices of refractions, it can be ascertained if the advantages and teachings of the present invention are being utilized. It is also possible to align the rear intersection edges or reflective surfaces in parallel planes while still maintaining a 45° incident angle to the optical axis from each edge or reflecting surface.

As can be readily appreciated the film strip 8 position could be a vidicon that is being scanned for example with infrared in another application of the present invention.

By using a lower polygon reflecting member with a pair of planar mirrors inclined to one another with an included angle of 90° to form sets of roof mirrors, the aberration known as dynamic keystone distortion can be eliminated. If the upper polygon reflective member had simple plano mirror reflective facets and the lower polygon member likewise had plane mirror reflective facets the optical axis of the scanner system would rotate in space to track the moving film centroid and thereby introduce a dynamic keystone distortion into the projected image. The optical axis trace on any film centroid will experience a tilt which has been verified with computer ray tracing. This tilt angle will vary as the rotational angle of the scanner system is changed. Since the tilt angle changes with rotation of the scanner system, the amount of distortion will change with the scanner rotational angle. The resulting effect is that the image will appear smeared.

The use of a 90° roof mirror will have the effect of scanning the optical axis of the system in synchronism with the moving film centroid by translation so that the optical axis will always be incident upon the film perpendicular to the plane of the film. By maintaining this perpendicularity no keystone distortion will be introduced at any rotational angle of the scanner system. This translational effect is the direct result of the two 90° mirrors and their effect upon a relatively stationary light ray source. The scanner geometry will permit the speed of the film to be twice as fast as the speed of the intersecting edges of the roof mirrors at their junction with the optical axis of the system.

In both of the embodiments disclosed in the present invention, that is the embodiments of FIG. 1 and FIG. 2, the reflective roof configurations prevent image forming light rays from adjacent roof mirror pairs from entering the roof mirror pair which is forming the primary image. Thus, by preventing optical cross talk it is possible to remove secondary or ghost images from the resulting projected image. The use of the 90° roof mirror geometry in both embodiments adjacent the film and distant from the projection lens increases the permissible angular tolerances permitted in the construction of a commercial model. Thus, any wave front superimposition errors, for example from alignment errors will be minimized.

By illuminating two full film frames at all times during rotation of the scanning system the resultant projected image will be fully illuminated at all times as the scanner is rotated. If only one frame was illuminated a dark band will be generated to pass through the projected image as the scanner is rotated. Conversely, if the illuminating gate area is slightly larger than one film frame, a narrow brightly illuminated band will pass through the projected image as the scanner is rotated.

Thus, the two frame illumination requirement is important in a commercial embodiment although it would be possible to create special effects by variation of this illumination requirement; for example, the lap dissolved provided by illumination of two full film frames can be degenerated into a fast wipe by reducing the film gate illuminated area.

Finally in FIG. 5, a flat film gate with adjacent rollers 71 is shown to permit the film 66 to travel in a straight line past the film gate and then engage the teeth on the sprocket wheel which is integral with the upper polygon member. A curved film gate could be utilized and a slight loss in aberration control would be experienced. This loss of aberration control may be acceptable for certain applications if the number of polygon roof mirror segments are sufficiently great.

As noted above, it is possible to deviate from the above embodiments of the present invention and it will be readily understood by those skilled in the art that the invention is capable of many modifications and improvements within the scope and spirit thereof. Accordingly, it will be understood that the invention is not to be limited by the specific disclosed embodiment but only by the scope and spirit of the appended claims.

What is claimed is:

1. An optical scanner apparatus for the reflective modification of a transmission energy beam relative to an adjacent position comprising:
   a first member having an array of roof reflective members with a 60° included angle between each reflective surface;
   a second member having a plurality of a roof reflective member with a 90° included angle between each reflective surface, and
   mounting means for permitting a movement of the first and second members about a common axis, the first member reflective surfaces and the second member reflective surfaces mounted to reflect the energy beam three times on the first member and two times on the second member wherein $d_3$ is the distance from the common axis of the first and second members to the position, $d_2$ is the distance from the common axis to a plane containing the reflected transmission energy beam between the first member and second member reflective surfaces and $d_1$ is the distance between the first member and second member reflective surfaces in the plane containing the reflected transmission energy beam, the respective distances being related for an air equivalent optical path as follows:

$$d_3 = 2d_2 - d_1$$

2. The invention of claim 1 further including means for adjusting the distance of the energy beam transmission between reflective surfaces.

3. The invention of claim 1 further including receiving means indicating the presence of the energy beam at the position.

4. The invention of claim 1 further including means for projecting an energy beam from the position towards a first member.

5. The invention of claim 4 further including means for projecting the energy beam after it leave the second member.

6. The invention of claim 5 further including a refractive means having a focal surface substantially coincident with the common axis in the path of the energy beam.

7. The invention of claim 6 further including a recording member and means for conjoint rotation of the first member, second member and recording member.

8. The invention of claim 7 wherein the recording member is a film member.

9. The invention of claim 1 wherein baffles are positioned between adjacent roof reflective members.

10. The invention of claim 1 further including a lens means mounted adjacent a reflective member having a focal surface substantially coincidental with the common axis of rotation.

11. The invention of claim 1 wherein the mounting means further includes means for mounting a film strip.

12. The invention of claim 1 further including an image surface located adjacent the outer periphery of one member including at least two image frames and means for continuously illuminating both image frames.

13. The invention of claim 2 wherein the mounting means further includes an adjustment means for varying the optical path length between the reflective surface of the first and second members.

14. The invention of claim 13 wherein the adjustment means includes an adjustment member for moving one member relative to the other member parallel to the axis of rotation.

15. The invention of claim 13 further including a central nonrotatable shaft, bearing means attached to respectively the first and second members and the shaft wherein the adjustment member can move one of the first and second members along the shaft.

16. A continuous projector system for projecting images from a medium such as a film strip with a plurality of sequentially framed images comprising;
   a source of light energy;
   means for mounting the sequentially framed medium for continuous movement;
   a condenser lens assembly for refracting the source of light energy to continually illuminate at least two full frames of the film strip,
   a first scanner member having a plurality of reflective surfaces;
   a second scanner member having a plurality of reflective surfaces;
   mounting means for permitting a rotational movement of the first and second members about a common axis relative to the source of energy; and
   projection lens means having a focal surface substantially coincident with the common axis of rotation, including at least a doublet and a negative biconcave lens, the first member reflective surfaces and second member reflective surfaces mounted to reflect a transmitted light ray from the film medium so it can sweep a predetermined distance across the reflecting surfaces and the projection lens means can project real images, the light ray being reflected between at least a reflective surface on each scanner member, wherein $d_1$ is the distance along the optical axis between the reflective surfaces, $d_2$ is the radial distance from the common axis of rotation to a plane containing the reflected light ray between the two reflective surfaces and $d_3$ is the radial distance from the common axis of rotation to the image surface, the respective distances being related for an air equivalent optical path as follows:

$$d_3 = 2d_2 - d_1$$

17. The invention of claim 16 wherein the mounting means further includes means for mounting a film strip.

18. The invention of claim 16 wherein the mounting means further includes an adjustment means for varying the optical path length between the reflective surfaces of the first and second scanner members.

19. The invention of claim 18 wherein the adjustment means includes an adjustment member for moving one scanner member relative to the other scanner member parallel to the axis of rotation.

20. The invention of claim 18 further including a central shaft, bearing means attached to respectively the first and second scanner members and the shaft wherein the adjustment member can move one of the first and second scanner members along the shaft.

21. The invention of claim 16 wherein at least one surface of the condenser lens assembly being located in close proximity to the surface of the film strip.

22. A projector system for projecting images from a medium such as a film strip comprising:
   means for mounting a sequential framed medium to enable a source of energy such as light to illuminate two full frames of the medium;
   a first member having a plurality of 60° reflective surfaces;
   a second member having a plurality of roof reflective surfaces to provide a linear translation of the optical axis perpendicular to each frame;
   mounting means for permitting a rotational movement of the first and second members about a common axis relative to the source of energy; and
   lens means having a focal surface substantially coincident with the common axis of rotation, the first member reflective surfaces and second member roof reflective surfaces mounted to reflect a transmitted energy beam from the medium so an energy beam can sweep a predetermined distance across the reflecting surfaces and the lens means can project images.

23. The invention of claim 22 wherein the roof reflecting surfaces are positioned to form a 90° angle between the surfaces.

24. The invention of claim 22 wherein the optical axis of the projector system is defined by the position of the first member, second member and medium as follows: $d_1$ is the distance along the optical axis between the first and second member; $d_2$ is the distance from the common axis of rotation to a plane containing the optical axis between the members and $d_3$ is the distance from the common axis of rotation to the medium, the respective distances being related for an air equivalent optical path as follows:

$$d_3 = 2d_2 - d_1$$

25. The invention of claim 24 wherein the reflecting surfaces of the first and second members are positioned to form a 90° angle between the surfaces.

26. The invention of claim 24 wherein the mounting means further includes an adjustment means for varying the optical path length between the reflective surfaces of the first and second members.

27. The invention of claim 26 wherein the adjustment means includes an adjustment member for moving one member relative to the other member parallel to the axis of rotation.

28. The invention of claim 26 further including a central shaft, bearing means attached to respectively the first and second members and the shaft wherein the adjustment member can move one of the first and second members along the shaft.

29. The invention of claim 22 wherein the means for mounting the medium further includes means for conjointly rotating the medium with the first and second members.

30. The invention of claim 22 wherein the first and second members have a polygonal configuration with an equal number of reflecting surface facets.

31. The invention of claim 30 wherein baffles are positioned between adjacent facets on each polygon member.

* * * * *